Figure 1:
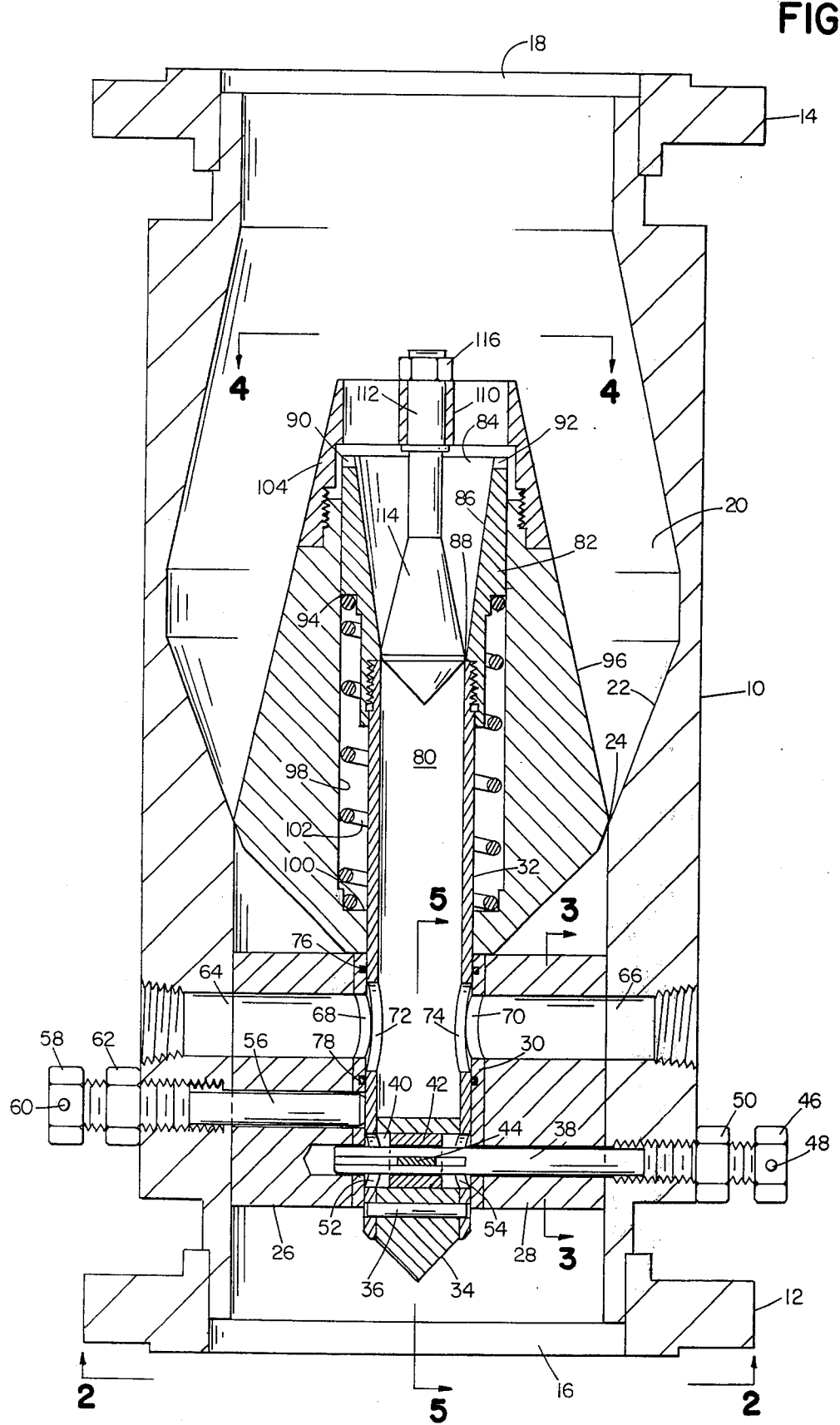

United States Patent [19]

Sanderson et al.

[11] 3,934,604
[45] Jan. 27, 1976

[54] PROPORTIONING APPARATUS

[75] Inventors: Ian S. Sanderson, Kennebunk; John C. Hardy, Gorham, both of Maine

[73] Assignee: Rockwood Systems Corporation, South Portland, Maine

[22] Filed: Aug. 30, 1974

[21] Appl. No.: 502,052

[52] U.S. Cl. .................... 137/98; 169/14; 137/114; 137/512.3; 137/512.5; 137/513
[51] Int. Cl.² .......................................... G05D 11/02
[58] Field of Search .......... 169/14, 15; 137/98, 114, 137/512, 512.3, 512.5, 513

[56] References Cited
FOREIGN PATENTS OR APPLICATIONS
1,195,642  5/1958  France ............................ 137/512.3
1,203,282  5/1967  United Kingdom ............. 137/512.5

Primary Examiner—William R. Cline
Assistant Examiner—H. Jay Spiegel

[57] ABSTRACT

Proportioning apparatus comprising a pair of coaxial tubular members with passages having first and second outwardly extending walls of the same cross-sectional configuration, first and second valve bodies for coaction with said walls for progressively opening and closing said passages, said first valve body slidably mounted on one of said tubular members, said second valve body connected to said first valve body for movement therewith and biasing means urging said valve bodies to their closed positions.

14 Claims, 5 Drawing Figures

PROPORTIONING APPARATUS

This invention relates to proportioning apparatus for mixing a primary and a secondary liquid, such as water and a fire extinguishing foaming agent, in predetermined proportions.

It is a principal object of this invention to provide proportioning apparatus which accurately proportions the flow of two liquids over a wide range of flows of the primary liquid. It is another object of this invention to provide proportioning apparatus which eliminates cocking moments and resulting friction and hysteresis. It is another object to provide proportioning apparatus which may have minor proportioning adjustments made externally thereto. It is yet another object of this invention to provide proportioning apparatus which may have major proportioning adjustments made thereto in a simple expeditious manner. Other objects are to provide proportioning apparatus adapted for in-line pipe attachment, which is compact, which provides homogeneous liquid mixing and which may be attached on either the suction or pressure side of a pump.

In general the invention features a tubular housing having an inlet, an outlet, a passage therebetween, and an outwardly extending first wall facing the outlet. A first valve body is positioned in the housing movable from the first wall toward the housing outlet progressively opening the passage at said wall upon movement toward the housing outlet. A tubular sleeve is positioned coaxially within the housing and has an inlet, an outlet facing the housing outlet, a passage therebetween, the sleeve passage having an outwardly extending second wall facing the housing outlet, the first and second walls having the same cross-sectional configurations. A second valve body is positioned in the sleeve movable from the second wall toward the housing outlet progressively opening the passage at said wall upon movement toward the housing outlet. The first valve body is tubular and is slidably mounted on the sleeve with the sleeve extending therethrough. The second valve body is connected to the first valve body and is movable therewith whereby said housing and sleeve passages are simultaneously opened and closed. Biasing means are connected to one of the valve bodies urging said valve bodies to their closed positions.

In preferred embodiments, the housing and sleeve passages are of circular cross-section. The cross-sectional area of the second valve body is smaller than that of the first valve body. A major portion of the tubular portion of the first valve body is annularly recessed and the biasing means comprises a compression spring positioned in the annular recess connected between the sleeve and the first valve body. The second valve body has a maximum dimension smaller than that of the sleeve passage; the second wall is outwardly tapered toward the housing outlet; the sleeve is supported by arms extending inwardly into the housing passage; and the sleeve is axially slidable relative to the second valve body. The second wall is removably attached to the sleeve. The sleeve inlet comprises passages through said arms, equally circumferentially disposed around the sleeve, and axially elongated ports in the sleeve. A shaft extends from the exterior of the housing through one of the arms to control means for adjusting the axial position of the sleeve and the control means comprises an eccentric positioned within the sleeve, a pair of axially spaced walls provided within the sleeve abutting the eccentric.

Figure 2:
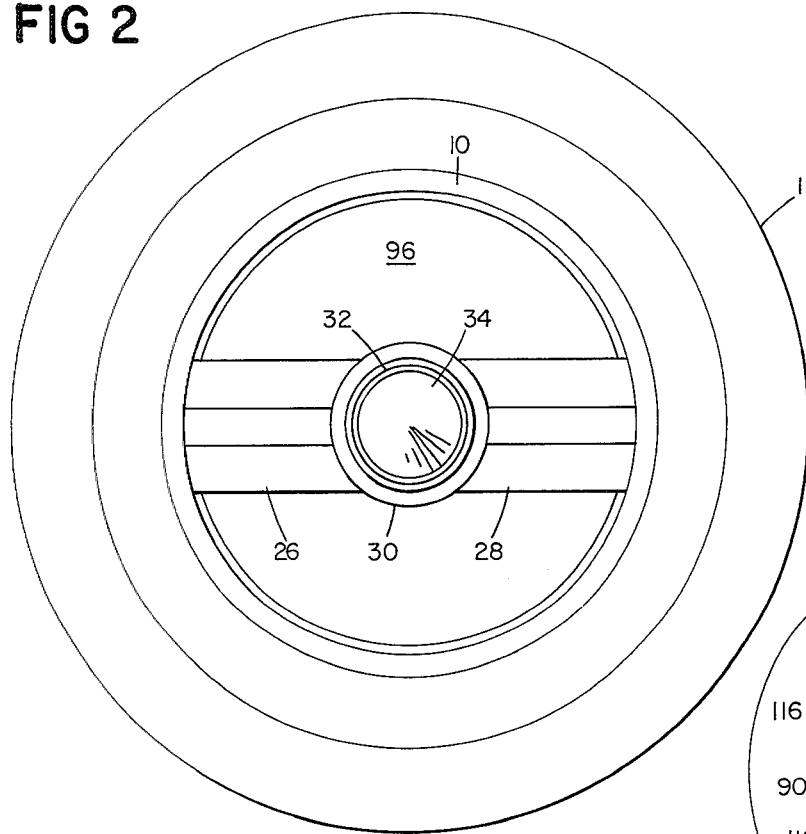
Figure 4:
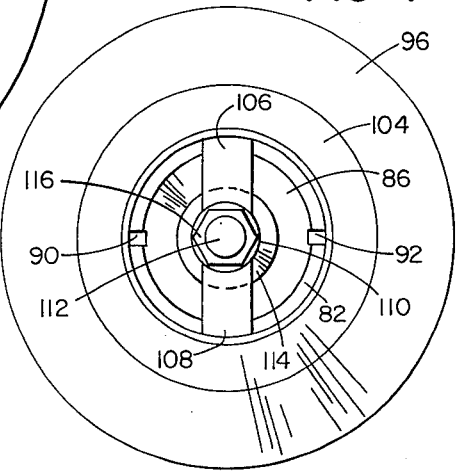
Figure 3:
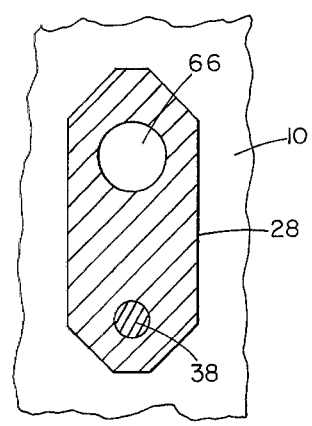

Other objects, features and advantages of this invention will occur to those skilled in the art from the following detailed description of a preferred embodiment thereof taken together with the accompanying drawings, in which:

FIG. 1 is a sectional view of proportioning apparatus embodying the invention;
FIG. 2 is a view taken along the line 2—2 of FIG. 1;
FIG. 3 is a view taken along the line 3—3 of FIG. 1;
FIG. 4 is a view taken along the line 4—4 of FIG. 1; and,
FIG. 5 is a view taken along the line 5—5 of FIG. 1.

With reference to the drawings, and particularly FIGS. 1 and 2 thereof, the proportioning apparatus comprises a tubular valve housing 10 having mounting flanges 12, 14 on each end thereof. The housing 10 is of circular cross-section and defines a liquid housing inlet 16 adapted for connection to a primary liquid source at one end thereof, a liquid housing outlet 18 at the other end thereof and a housing passage 20 therebetween. The interior of housing 10 includes a first generally conical wall 22 outwardly diverging in direction from housing inlet toward housing outlet 18, first wall 22 defining at its smallest dimension a liquid flow housing orifice 24 within housing 10. In the illustrated preferred embodiment first wall 22 diverges at an angle of 28° 48' from a diameter of 6.045 inches at housing orifice 24 to a maximum diameter of 8.360 inches. The diameter at orifice 24 is the same as the housing inlet 16 diameter and outwardly of first wall 22 the interior of housing 10 converges to approximately the same diameter, 6.080 inches, at housing outlet 18.

Adjacent housing inlet 16, between the housing inlet 16 and housing orifice 24, a pair of oppositely disposed arms 26, 28 form a spider radially extending inwardly from the inner wall of housing 10 to a centrally positioned tubular sleeve holder 30 coaxial of housing 10. The upstream and downstream edges of arms 26, 28 are tapered as best shown in FIG. 3. A tubular sleeve 32 of circular cross-section is mounted in sleeve holder 30 coaxially of housing 10. Sleeve 32 is axially slidable in holder 30 and extends forwardly from arms 26, 28 past orifice 24 toward housing outlet 18. Sleeve 32 in the illustrated embodiment has an outer diameter of 1.748 inches and an inner diameter of 1.375 inches.

Figure 5:
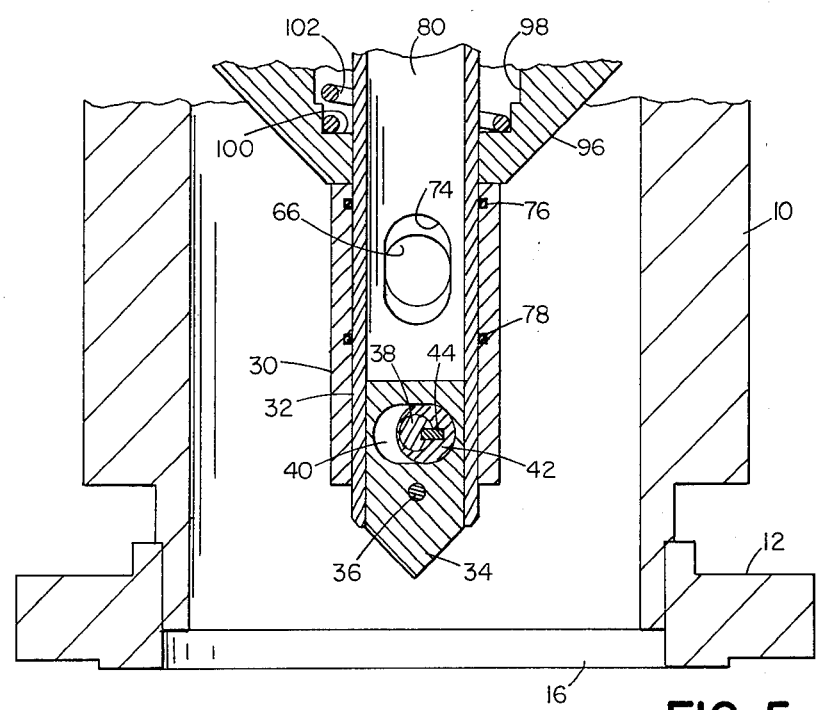

As shown in FIGS. 1 and 5, the end of sleeve 32 adjacent housing inlet 16 is closed by a plug 34 which is secured in sleeve 32 by a pin 36. A shaft 38, threaded to housing 10 adjacent the exterior thereof, extends through housing 10, arm 28, sleeve holder 30, and sleeve 32 into a transversely elongated aperture 40 in plug 34. Control means, eccentric 42, is positioned in aperture 40 and is secured to shaft 38 by a key 44. The axial dimension of aperture 40 is equal to the diameter of eccentric 42 so that as eccentric 42 is rotated it moves sleeve 32 axially. A nut 46 is secured by pin 48 to the shaft 38 on the exterior of housing 10 and a locknut 50 is provided to secure the shaft position. To accommodate axial movement of sleeve 32 on rotation of eccentric 42 the apertures 52, 54 in sleeve 32 through which shaft 38 extends are axially elongated as shown in FIG. 1. To additionally secure the axial position of sleeve 32, a second shaft 56, threaded to housing 10 adjacent the exterior thereof, extends through housing 10, arm 26, and sleeve holder 30 to bear upon the exterior of sleeve 32. A nut 58 is secured by pin 60 to the shaft 56 on the exterior of housing 10 and a locknut 62 is provided to secure the shaft position.

Passages 64, 66 in arms 26, 28 adapted for connection to a secondary liquid source communicate through ports 68, 70 in sleeve holder 30 and through ports 72, 74 in sleeve 32 to form a sleeve inlet downstream of plug 34. Sleeve ports 72, 74 are axially elongated as best shown in FIG. 5 to permit full registry thereof with passages 64, 66 and ports 68, 70 regardless of the axial position of sleeve 32. O-ring seals 76, 78 are provided in recesses in sleeve holder 30 on each side of sleeve ports 72, 74 bearing against sleeve 32 to prevent leakage of the second liquid therepast.

Sleeve 32 extends downstream within housing 10 past housing orifice 24 defining a sleeve passage 80 for the secondary liquid. Threadedly attached to the end of sleeve 32 is a sleeve extension 82 which defines at the end thereof, within housing 10 and facing housing outlet 18, a sleeve outlet 84. The interior of sleeve extension includes a second generally conical wall 86 outwardly diverging from sleeve 32 inner diameter in a direction toward housing outlet 18, defining at the junction of sleeve 32 and second wall 86 a sleeve orifice 88. The angle at which second wall 86 diverges is selected according to the desired percentage of second liquid to be mixed with the first liquid. In the illustrated embodiment, for an 8% mixture the angle is 7° 9'; for a 6% mixture the angle is 5° 39'; and for a 4% mixture the angle is 3° 58'. Slots 90, 92 are provided in the end of sleeve extension 82 to facilitate the removal thereof from sleeve 32. The outer diameter of sleeve extension 82 is larger 2.755 inches than that of sleeve 32 thereby providing a shoulder 94 facing upstream toward housing inlet 16.

A tubular first valve body 96 is slidably mounted on sleeve 32 and sleeve extension 82. First valve body 96 is slidable between a first position toward housing inlet 16 in which its maximum diameter substantially closes housing orifice 24 and a second position toward housing outlet 18 whereby in moving toward said second position first valve body progressively opens housing orifice 24. In its first position, first valve body 96 extends axially toward housing inlet 16 abutting arms 26, 28 which provide a stop for the first valve body. At its end adjacent housing inlet 16, first valve body has an inner diameter about equal to the outer diameter of sleeve 32 for sliding engagement therewith. Throughout the remainder of its axial length, comprising the major portion thereof the interior of first valve body 96 is annularly recessed to the outer diameter of sleeve extension 82 for sliding engagement therewith. The recessed portion 98 of first valve body 96 thereby provides a shoulder 100 facing the shoulder 94 of sleeve extension 82. A compression spring 102 is fitted in the recessed portion 98 bearing against shoulders 94, 100 biasing first valve body 96 to its first position.

A first valve body extension 104 is threadedly attached on the end adjacent housing outlet of first valve body 96 and in the first position thereof extends beyond the end of sleeve extension 82. As best shown in FIG. 4, a pair of oppositely disposed arms 106, 108 form a spider radially extending inwardly from first valve body extension 104, spanning sleeve outlet 84, to a centrally positioned tubular second valve body holder 110 coaxial of sleeve 32.

The stem 112 of a second valve body 114 is threadedly secured in holder 110 by nut 116. Second valve body 114 moves with first valve body 96 due to the connection thereof and extends to a first position, with first valve body 96 in its first position, to sleeve orifice 88. Second valve body 114 has a maximum diameter to substantially close sleeve orifice 88 in the first position thereof but is slightly smaller than the inner diameter of sleeve 32 for a slip fit therein whereby axial movement of sleeve 32 is permitted without interference from second valve body 114. The cross-sectional area of second valve body 114 at its maximum dimension is smaller than that of first valve body 96. Second valve body 114 moves to a second position, with the movement of first valve body 96 to its second position, progressively opening sleeve orifice 88 as it moves.

In operation, primary and secondary liquids are respectively introduced into housing inlet 16 and into the sleeve inlet defined by passages 64, 66 and ports 68, 70, 72, 74. Housing 10 is preferably arranged with its axis in a vertical position. The pressures of the two liquids are externally arranged to be approximately equal. The force produced by the flow of the primary liquid against first valve body 96 causes that valve body to move toward its second position against the biasing force of spring 102. As first valve body 96 moves, it also carries with it second valve body 114 thereby progressively opening orifices 24 and 88 whereby the liquids are mixed adjacent housing outlet 18 and exit from housing 10 thereat. The fact that walls 22, 86 have the same cross-sectional configuration, i.e., circular, results in a more accurately determinable proportional flow therethrough.

As can be seen, the orifices 24, 88 open simultaneously in conjunction with one another by an amount dictated by the flow force of the primary liquid, the predetermined proportion of primary and secondary liquid flows being maintained throughout the axial stroke of the first valve body 96. To make minor adjustments in the proportions the position of orifice 88 relative to second valve body 114 is adjusted. This is accomplished by loosening locknut 62 and turning nut 60 to relieve the pressure of shaft 56 against sleeve 32. Locknut 50 is then loosened and nut 46 is turned to rotate shaft 38 and eccentric 42. The rotation of eccentric 42 adjusts the axial position of sleeve 32 and orifice 88 relative to second valve body 114 resulting in greater or lesser flow of the secondary liquid relative to the primary liquid at a given primary liquid flow. The locknut 50 is tightened when the desired adjustment is made, shaft 56 is tightened against sleeve 32 and locknut 62 is then tightened to secure sleeve 32 in position.

A gross adjustment of flow proportions may be made by removing first valve body extension 104 from first valve body 96. Sleeve extension 82 is then removed from sleeve 32 and a new sleeve extension having a different angle of divergence of second wall 86 is substituted for the sleeve extension just removed. First valve body extension 104 is then replaced.

When the flow force of the primary liquid is reduced below the level of spring 102 biasing force, valve bodies 96, 114 are moved by spring 102 to close orifices 24, 88.

Other embodiments of this invention will occur to those skilled in the art which are within the scope of the following claims.

What is claimed is:
1. Proportioning apparatus comprising:
 a tubular valve housing comprising a housing inlet adapted for connection to a primary liquid source, a housing outlet, and a housing passage therebe- tween, said housing passage having a first outwardly extending wall facing said housing outlet;

a first valve body in said housing passage movable between a first position at said first wall and a second position remote therefrom toward said housing outlet, said first valve body and said first wall adapted for coaction to close said housing passage with said first valve body in said first position thereof and to progressively open said passage on movement of said first valve body toward said second position thereof;

a tubular sleeve mounted and extending coaxially within said housing passage, said sleeve having an outer dimension smaller than the minimum inner dimension of said housing passage, said sleeve comprising a sleeve inlet adapted for connection to a secondary liquid source, a sleeve outlet within said housing and facing said housing outlet, and a sleeve passage therebetween, said sleeve passage having a second outwardly extending wall facing said housing outlet, said first and second walls having the same cross-sectional configurations;

a second valve body in said sleeve movable between a first position at said second wall and a second position remote therefrom toward said housing outlet, said second valve body having a maximum dimension smaller than the dimension at said first position of said second valve body, of said sleeve passage, said second wall extending from said first position of said second valve body toward said second position thereof and outwardly tapered having a progressively greater inner dimension in a direction toward said second position of said second valve body, said second valve body and said second wall adapted for coaction to close said sleeve passage with said second valve body in said first position thereof and to progressively open said passage on movement of said second valve body toward said second position thereof;

said first valve body being tubular and being slidably mounted on said sleeve with said sleeve extending therethrough, said first valve body slidable on said sleeve between said first and second positions thereof;

said second valve body connected to said first valve body and movable between said first and second positions thereof with said first valve body for proportional opening of said housing and said sleeve passages together, said first and second positions of said first valve body corresponding to said first and second positions of said second valve body; and biasing means connected to one of said valve bodies urging said valve bodies to their respective first positions.

2. The apparatus claimed in claim 1 in which said second wall is removably attached to said sleeve.

3. The apparatus claimed in claim 1 in which said first wall extends from said first position of said first valve body toward said second position thereof, tapering outwardly having a progressively greater inner dimension in a direction toward said second position of said first valve body.

4. The apparatus claimed in claim 1 in which arms are connected to said valve housing and extend into said housing passage, said sleeve is connected to and supported by said arms and said sleeve is axially slidably mounted to said arms for movement relative to said second valve body whereby said first position of said second valve body relative to said sleeve may be adjusted.

5. The apparatus claimed in claim 4 in which said sleeve inlet comprises arm passages through a plurality of said arms equally circumferentially spaced and a port in said sleeve aligned with each said arm passage, each said passage larger in an axial direction of said sleeve than the arm passage with which it is aligned for full registry of said ports and said arm passages in a plurality of axial positions of said sleeve.

6. The apparatus claimed in claim 4 in which a shaft extends from the exterior of said valve housing, through one of said arms to said sleeve and control means for adjusting the axial position of said sleeve are connected to said shaft whereby said shaft position may be adjusted exteriorly of said valve housing.

7. The apparatus claimed in claim 6 in which said control means comprises an eccentric positioned within said sleeve and in which a pair of axially spaced walls are provided within said sleeve abutting said eccentric whereby rotation of said shaft and said eccentric axially moves said sleeve.

8. The apparatus claimed in claim 7 in which said sleeve inlet comprises arm passages through a plurality of said arms equally circumferentially spaced and a port in said sleeve aligned with each said arm passage, each said passage larger in an axial direction of said sleeve than the arm passage with which it is aligned for full registry of said ports and said arm passages in a plurality of axial positions of said sleeve.

9. The apparatus claimed in claim 8 in which said first wall extends from said first position of said first valve body toward said second position thereof, tapering outwardly having a progressively greater inner dimension in a direction toward said second position of said first valve body.

10. The apparatus claimed in claim 9 in which said second wall is removably attached to said sleeve.

11. The apparatus claimed in claim 10 in which a major portion of the tubular portion of said first valve body is annularly recessed from said sleeve.

12. The apparatus claimed in claim 11 in which said biasing means comprises spring positioned in the annularly recessed portion of said first valve body, said spring connected between said sleeve and said first valve body.

13. The apparatus claimed in claim 12 in which said housing and sleeve passages are of circular cross-sectional configuration.

14. The apparatus claimed in claim 13 in which the cross-sectional area of said second valve body is smaller than the cross-sectional area of the portion of said first valve body exposed to said housing passage at said first wall.

* * * * *

UNITED STATES PATENT AND TRADEMARK OFFICE
CERTIFICATE OF CORRECTION

PATENT NO. : 3,934,604
DATED : January 27, 1976
INVENTOR(S) : Ian S. Sanderson, et al.

It is certified that error appears in the above-identified patent and that said Letters Patent are hereby corrected as shown below:

Claim 12, column 6, line 50, after "comprises", insert --a compression--.

Signed and Sealed this twentieth Day of April 1976

[SEAL]

Attest:

RUTH C. MASON
Attesting Officer

C. MARSHALL DANN
Commissioner of Patents and Trademarks